United States Patent
Tanaka (10) Patent No.: US 6,832,303 B2
(45) Date of Patent: Dec. 14, 2004

(54) METHOD AND SYSTEM FOR MANAGING AN ALLOCATION OF A PORTION OF A MEMORY

(75) Inventor: Motoo Tanaka, Pleasanton, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 385 days.

(21) Appl. No.: 10/033,778

(22) Filed: Jan. 3, 2002

(65) Prior Publication Data

US 2003/0126393 A1 Jul. 3, 2003

(51) Int. Cl.[7] .............................................. G06F 12/02
(52) U.S. Cl. ........................ 711/173; 711/5; 711/209
(58) Field of Search ............................ 711/5, 115, 170, 711/171, 173, 202, 203, 209, 211; 707/205

(56) References Cited

U.S. PATENT DOCUMENTS 6,334,175 B1 * 12/2001 Chih .......................... 711/170

* cited by examiner

Primary Examiner—Gary Portka (57) ABSTRACT

A method and system are disclosed for managing an allocation of a portion of a memory associated with a central processing unit system that can be selectively coupled to a bus of the central processing unit system. In accordance with exemplary embodiments of the present invention, a first portion of the memory is allocated for a first range of addresses. The allocated first portion of the memory is selectively coupled to the bus of the central processing unit system. The selectively coupled first portion of the memory is decoupled from the bus of the central processing unit system. The decoupled first portion of the memory is reallocated for a second range of addresses.

18 Claims, 8 Drawing Sheets

METHOD AND SYSTEM FOR MANAGING AN ALLOCATION OF A PORTION OF A MEMORY

BACKGROUND

1. Field of the Invention

The present invention relates to computer memory management. More particularly, the present invention relates to a method and system for managing an allocation of a portion of a memory associated with a central processing unit system.

2. Background Information

Memory space within a computer can be allocated for exclusive use by a particular application or process. A "memory space" is a plurality of positions in a computer memory, each position corresponding to a basic unit of memory, such as, for example, a byte or word. The process runs in the physical or real memory of the computer. "Real memory" refers to the actual computer memory chips, such as, for example, random access memory (RAM) computer chips, that are installed in a computer. Once the process has completed, the memory is deallocated and made available for subsequent allocation.

Status information can be maintained for each portion of the memory space. The status information indicates whether the memory is currently allocated and, therefore, not available. When a process involves using a block of memory, a suitable portion of available memory is first identified and then allocated to the process. Memory allocation is typically performed on a block basis, where memory blocks are allocated to a given process. A "memory block" is a contiguous portion of memory locations or addresses. The number of addresses in a memory block is the memory block size.

Real memory, also referred to as main memory or simply memory, is directly accessible to the processor of the computer and stores the current application or process being executed. Real memory may have several memory modules, with each memory module having its own bus interface logic. A memory location is accessed through multilevel address decoding.

For example, the address bits specifying a memory location to be accessed can be divided into three groups. The upper group of address bits can be decoded to enable one of several memory modules in the memory. For the enabled memory module, the middle group of address bits can be decoded to select one of several rows of memory devices in the memory module. The lower group of address bits can be decoded inside the selected memory devices to access one of many locations. Each memory module is assigned to an address range, which is specified by its interface logic. During a memory reference, the address is sent to all memory modules, and one memory module that contains that address is activated. Data are then read from or written to the selected memory module.

Memory management of the computer's real memory includes three basic operations: allocation, deallocation, and consolidation. In the allocation phase, the computer receives a request for a memory block and identifies a suitable non-allocated block of memory. The computer then allots the identified block by first marking the block as allocated and then communicates to the requesting process which memory block is available for use. In the deallocation phase, the computer receives a communication indicating that a process is done with a previously allocated block of memory and then marks that block as being available for subsequent allocation.

In dividing or partitioning the real memory, the computer can fragment the memory into a number of blocks. If this process is continued unchecked, the memory can be divided into many small blocks of unused memory. The computer may be unable to satisfy allocation requests for memory portions larger than the largest fragment, even though a substantial portion of the memory space remains unused. This memory fragmentation can be inefficient in the use of the memory space and can result in false indications that the memory space is exhausted.

To alleviate memory fragmentation, in the consolidation phase, the computer can attempt to join one or several contiguous blocks of available memory to form a larger contiguous memory block. Thus, consolidation, also referred to as coalescing, rearranges allocated fragments so that unused portions of the memory space are combined.

Figure 1:
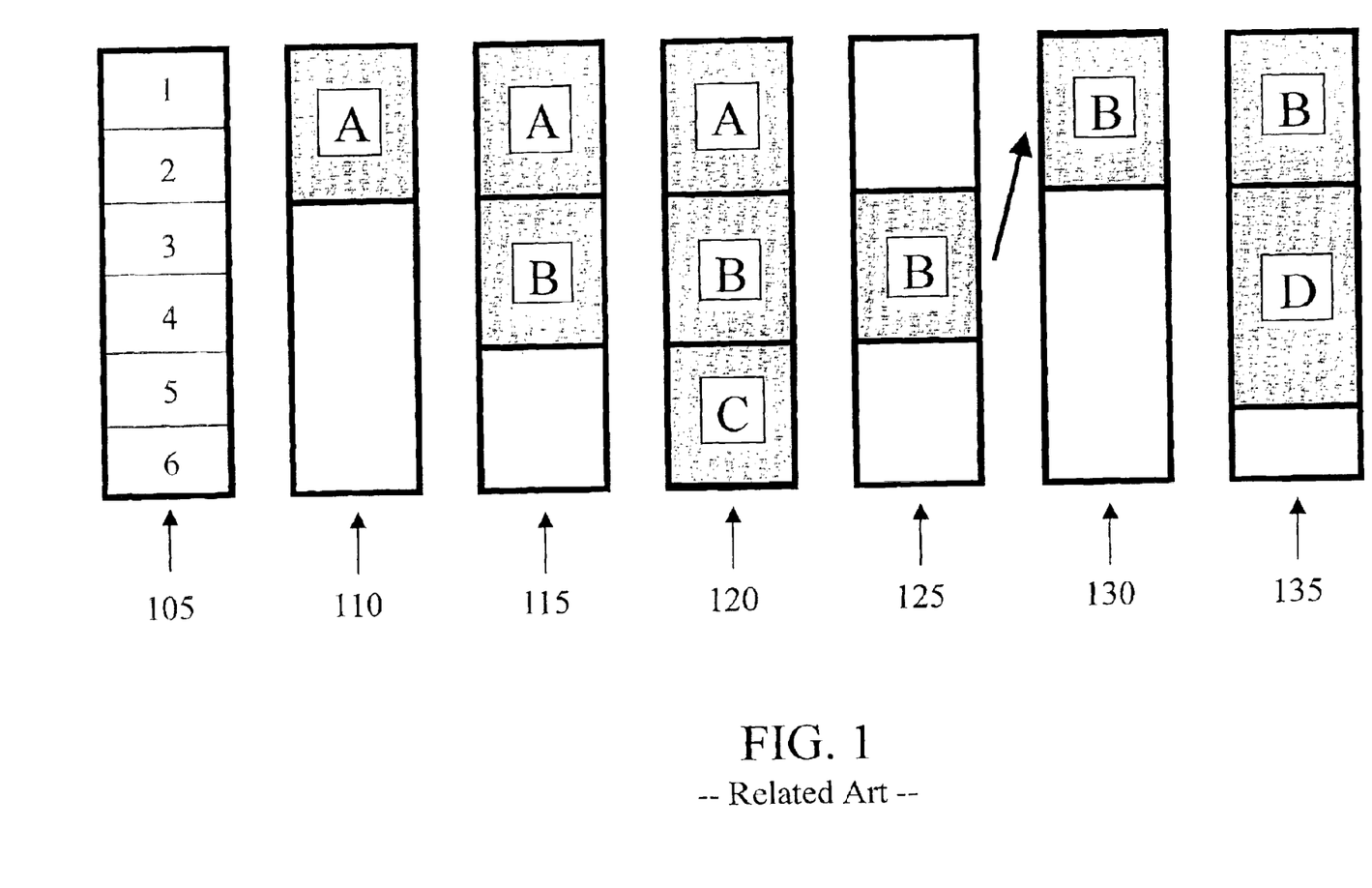
FIG. 1 is a block diagram illustrating the process of memory allocation, deallocation, and consolidation in a conventional memory management scheme.

FIG. 1 illustrates the process of memory allocation, deallocation, and consolidation in a conventional memory management scheme where there are six memory blocks in the memory space. The memory locations are physically and electrically connected to a computer bus at fixed physical and logical addresses. In step 105, no memory blocks are allocated. In step 110, process A requests and is allocated two memory blocks. In step 115, process B requests and is allocated two memory blocks. In step 120, process C requests and is allocated two memory blocks. In step 125, processes A and C are completed, and so their respective memory blocks are deallocated and made available for other processes. Although there are now four memory blocks available in step 125, if a process D requests three memory blocks, the operating system moves the contents of memory blocks allocated for process B so that it can provide three contiguous memory blocks to process D. The consolidation phase is performed in step 130. After consolidation, in step 135, process D can be allocated the three memory blocks.

By moving blocks of memory as part of the consolidation phase, the memory management scheme makes the memory look like it is relocatable within the memory space. However, unpredictable memory management, processing overhead, and memory fragmentation occur.

SUMMARY OF THE INVENTION

A method and system are disclosed for managing an allocation of a portion of a memory associated with a central processing unit system that can be selectively coupled to a bus of the central processing unit system. In accordance with exemplary embodiments of the present invention, a first portion of the memory is allocated for a first range of addresses. The allocated first portion of the memory is selectively coupled to the bus of the central processing unit system. The selectively coupled first portion of the memory is decoupled from the bus of the central processing unit system. The decoupled first portion of the memory is reallocated for a second range of addresses.

In accordance with an alternate embodiment of the present invention, a system for managing an allocation of a portion of a memory comprises at least one central processing unit, at least one bus connected to the at least one central processing unit, and at least one memory module associated with the memory. The at least one memory module is electrically decoupled from the at least one bus. The at least one memory module comprises means for electrically coupling the at least one memory module with the bus, and at least one memory unit.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 2:
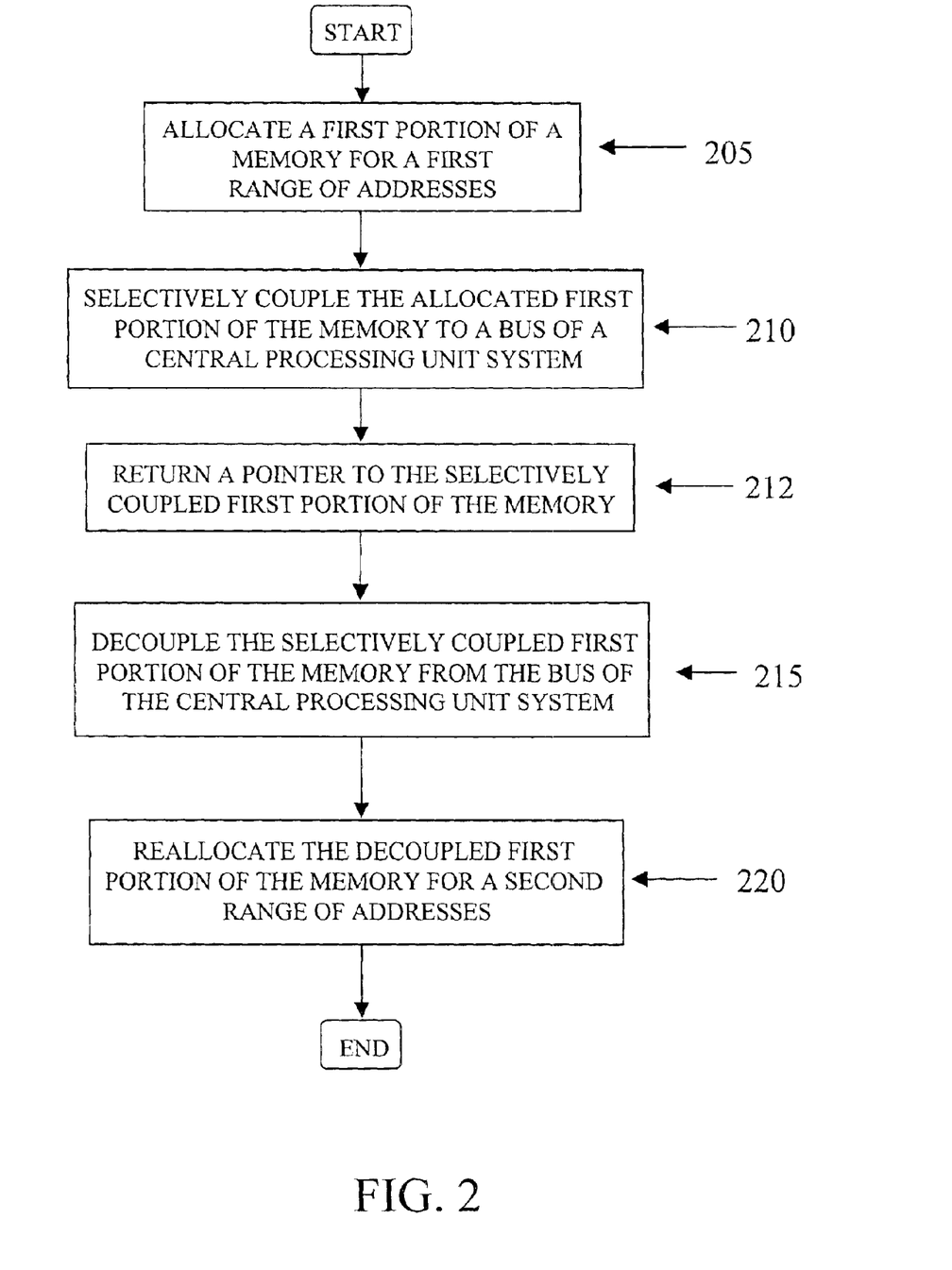
FIGS. 2–5 are flowcharts illustrating the steps for managing an allocation of a portion of a memory associated with a central processing unit system that can be selectively coupled to a bus of the central processing unit system in accordance with an exemplary embodiment of the present invention.

FIG. 2 is a flowchart illustrating the steps carried out for managing an allocation of a portion of a memory associated with a central processing unit system that can be selectively coupled to a bus of the central processing unit system in accordance with an exemplary embodiment of the present invention. In the following discussion, the words "attach," "connect," and "couple" will be used interchangeably to refer to an electrical connection between electronic components that allows any form of electrical signal to be passed between the electronic components. In addition, the words "detach," "disconnect," and "decouple" will be used interchangeably to refer to an electrical disconnection between electronic components that does not allow any form of electrical signal to be passed between the electronic components.

As used herein, a "central processing unit system" is any form of computer, such as, for example, a personal computer, a workstation, a minicomputer, a mainframe, or a supercomputer, that contains at least a central processing unit (CPU), a bus, and memory. The CPU system can be comprised of a single CPU or multiple CPUs.

As used herein, a "CPU" is a component that can fetch instructions or commands from memory and execute those instructions or commands to perform a specific task. The CPU can be any form of processor, such as, for example, a microprocessor.

As used herein, a "bus" is any collection of wires through which data is transmitted from one part of a computer to another. According to exemplary embodiments, the bus is a system bus internal to the CPU system that connects internal computer components to the CPU and memory. The bus can be divided into several groups, such as, for example, an address bus, a data bus, and a control bus. The data bus transfers actual data, while the address bus transfers information on where the data should go. The control bus can be used to transfer control signals.

As used herein, the "memory" is the pool of physical or real memory of the CPU system that is available for use by applications or processes. The memory, also referred to as main memory, can be, for example, random access memory (RAM) or any other form of addressable read/write memory that can be allocated to applications or processes running in the CPU system that require internal storage in the CPU system.

According to exemplary embodiments, the memory is electrically detached from the bus of the CPU system and can be electrically attached to and detached from the bus. Thus, the memory is independent of and isolated from the bus so that there is no fixed connection between the memory and the bus. The memory can include at least one portion, such as, for example, a block of memory Each portion of the memory can, therefore, be electrically attached to and detached from the bus. According to exemplary embodiments, each portion of memory can have its memory address space reassigned. Thus, the address of each portion of memory can be changed. For example, the upper or high-order address bits of each portion of memory can be electrically reconfigured or changed so that each portion of memory can have any address within the system memory space of the CPU system. The lower or low-order address bits can select the storage location within each portion of memory. The system memory space of the CPU system is the total range of addresses available for applications and processes. According to exemplary embodiments, the system memory space is large enough to hold the address spaces of at least one process concurrently.

In step 205 of FIG. 2, a first portion of the memory is allocated for a first range of addresses. The memory allocation phase according to exemplary embodiments of the present invention will be described with reference to FIG. 3.

Figure 3:
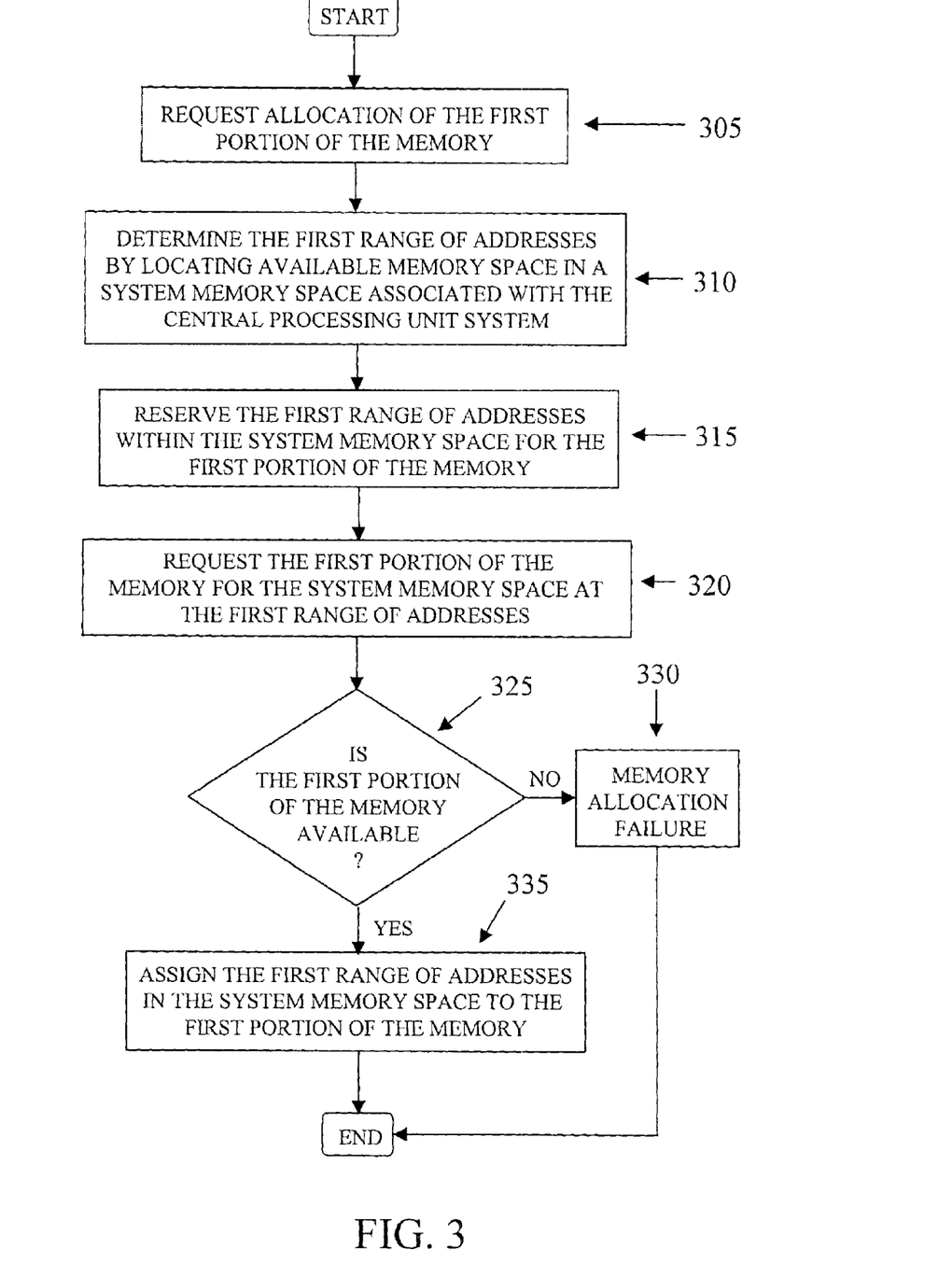

In step 305 of FIG. 3, the allocation of the first portion of the memory is requested. After a process is initiated, the process can request a portion of memory from, for example, the operating system running on the CPU system. The operating system is a collection of system programs that, for example, supervises the operation of the CPU system, manages both the hardware and software resources of the CPU system, and provides an interface between the user and the CPU system. The process can request a portion of memory of a particular size needed to run the process. The portion of memory will have a range of addresses located in the system memory space of the CPU system.

In step 310, the first range of addresses is determined by locating available memory space in a system memory space associated with the central processing unit system. According to exemplary embodiments, upon request, the operating system can locate available memory space in the system memory space of the particular size requested by the process.

In step 315, the first range of addresses are reserved within the system memory space for the first portion of memory. According to exemplary embodiments, the operating system can assign the first range of addresses within the system memory space to the portion of the memory. In step 320, the first portion of memory is requested for the system memory space at the first range of addresses. According to exemplary embodiments, the operating system can request a portion of memory of the particular size needed by the process from a memory manager. The memory manager controls the dynamic allocation of memory. The memory manager can be used to allocate, attach and detach blocks of memory from the available pool of memory.

In step 325, the availability of the first portion of memory is determined. According to exemplary embodiments, the memory manager checks if enough memory blocks are available from the memory to fulfill the request for memory of the requested size. If the first portion of memory is not available, in step 330 a memory allocation failure or other similar type of error can be issued. Thus, if there are not enough memory blocks to fulfill the request for memory, a memory allocation failure can be issued. For example, the memory allocation failure can be returned to the operating system, and the operating system can inform the process of the lack of memory resources. The operating system and/or process then processes the memory allocation appropriately, such as, for example, by causing the process to terminate or by performing any other appropriate response. The memory allocation procedure of the present invention would then end and wait for another memory allocation request.

If the first portion of memory is available (i.e., there are enough blocks of memory available to fulfill the request), the first portion of memory is allocated for the first range of addresses. The memory manager can allocate the portion of memory. In step 335, the first range of addresses in the system memory space is assigned to the first portion of the memory. The memory manager can assign the first range of addresses of the system memory space to the allocated memory blocks. Thus, the memory blocks can be assigned the first range of addresses while detached from the bus.

According to exemplary embodiments, the upper address bits of the memory blocks can be reconfigured to the first range of addresses using, for example, a reconfigurable address decoder included in the portion of memory. A pointer to the first portion of memory can be returned. According to exemplary embodiments, the pointer to the memory blocks allocated by the memory manager can be returned to the operating system.

In step 210 of FIG. 2, the allocated first portion of memory is selectively coupled to the bus of the central processing unit system. According to exemplary embodiments, the operating system can issue control signals or commands to attach the allocated memory blocks to the bus. However, either the operating system or the memory manager can electrically attach the memory blocks to the bus. The memory blocks can be electrically attached to the bus by using, for example, a tri-state, bi-directional buffer interface between the bus and the memory block or any other form of bus interface logic that allows a memory block to be electrically attached to and detached from the bus of the CPU system.

In step 212, a pointer to the first portion of memory can be returned. According to exemplary embodiments, the operating system can return a pointer to the allocated and electrically attached memory blocks to the process that originally requested the memory. The process can use the returned pointer to access the allocated and electrically attached memory blocks.

When the process that requested the memory blocks terminates or is otherwise finished with the memory blocks, the memory blocks are electrically detached from the bus and deallocated. In step 215 of FIG. 2, the selectively coupled first portion of memory is decoupled from the bus of the central processing unit system. The memory blocks can be returned by the process by, for example, returning the pointer to the memory blocks to the operating system and/or memory manager. However, any form of indication from the application or process can be used that signifies that the application or process is finished with the allocated and electrically coupled memory blocks. According to exemplary embodiments, the operating system can electrically detach the memory blocks from the bus upon indication that the blocks are no longer being used by, for example, instructing the memory manager to command the memory block to electrically detach. However, either the operating system or the memory manager can electrically detach the memory blocks.

Figure 4:
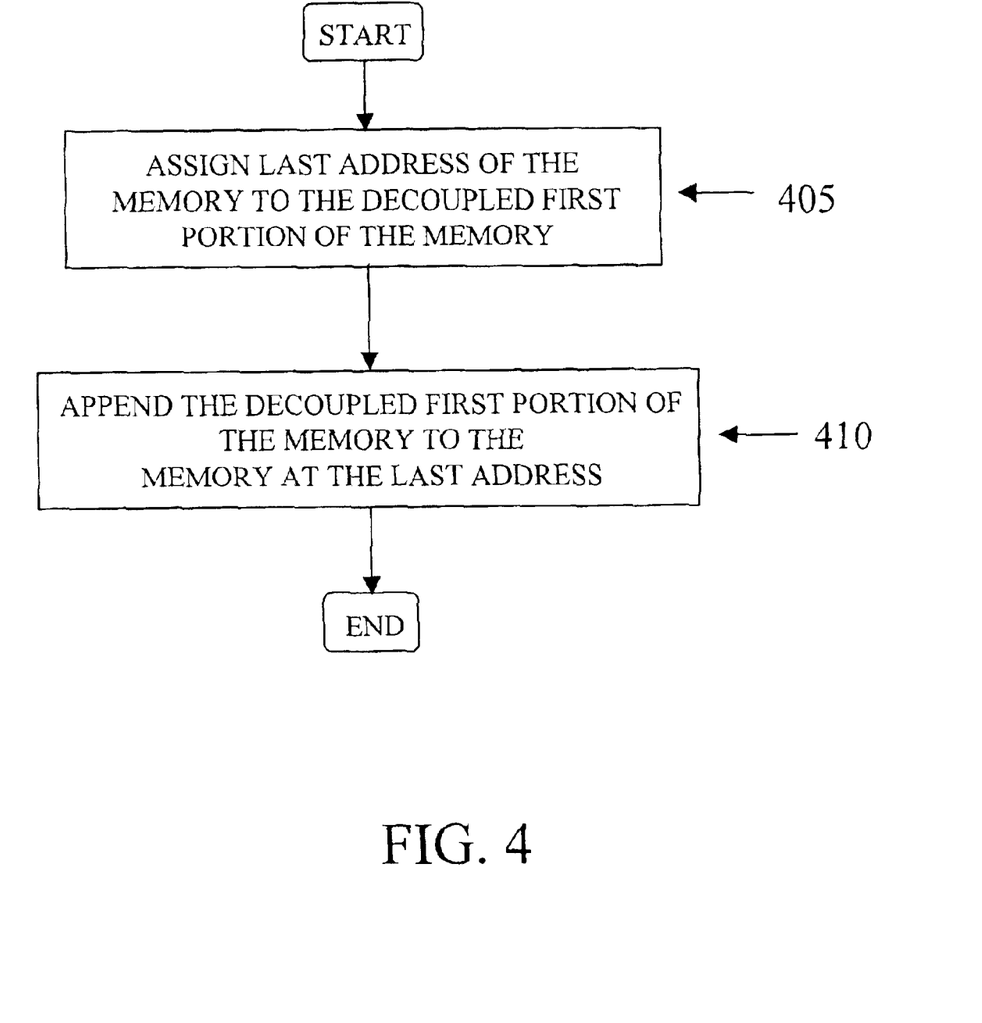

The decoupling according to exemplary embodiments of the present invention includes the steps illustrated in FIG. 4. In step 405, a last address of the memory is assigned to the decoupled first portion of memory. For example, memory can be organized in a last-in, first-out (LIFO) structure or any other type of memory structure in which the most-recently decoupled and deallocated memory blocks returned to memory are the first memory blocks allocated and coupled the next time a process requests memory. Thus, the last address in the memory is the last free address in the pool of available memory. In step 410, the decoupled first portion of memory is appended to the memory at the last address. Steps 405 and 410 can be performed by the memory manager for each memory block decoupled and deallocated.

Once the memory blocks are detached and deallocated, the memory blocks can be allocated and attached for another process that requests memory. In step 220 in FIG. 2, the decoupled first portion of the memory is reallocated for a second range of addresses. The steps of allocation, selectively coupling, and decoupling performed in steps 205, 210 and 215 of FIG. 2 can then be performed for the second range of addresses for the same or different process that requests memory.

Figure 5:
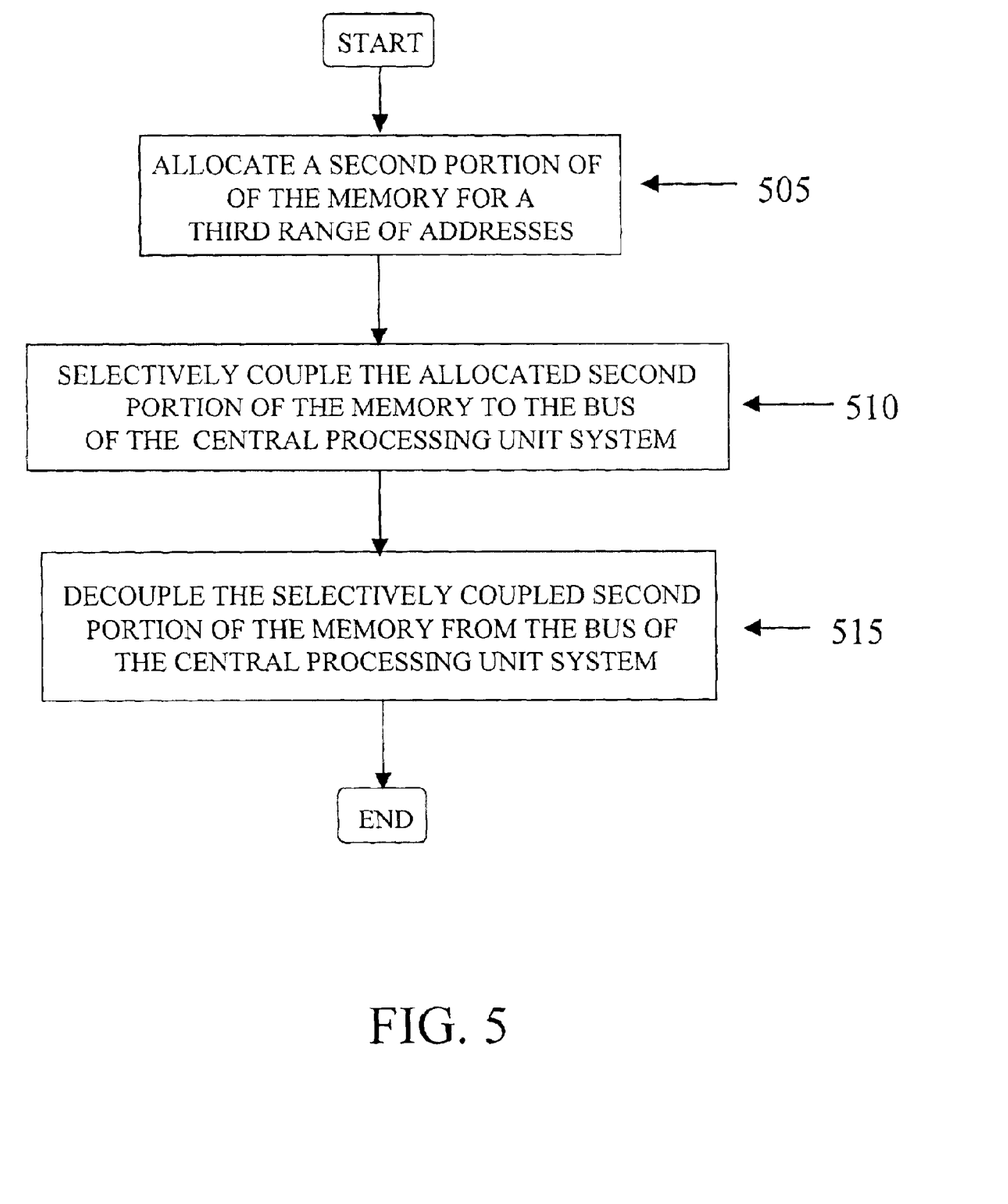

Additional allocations of memory can be performed for additional processes that run either serially or concurrently in the system memory space. For example, additional memory allocations can be performed using the steps illustrated in FIG. 5. If another process requests memory, in step 505, a second portion of memory is allocated for a third range of addresses. In step 510, the allocated second portion of memory is selectively coupled to the bus of the central processing unit. When this additional process terminates or is otherwise completed with the selectively coupled second portion of memory, in step 515 the selectively coupled second portion of memory is decoupled from the bus of the central processing unit system. The decoupled second portion of memory is assigned the last address of the memory and appended to the memory at the last address. The second portion of memory is then available for allocation to yet another process.

Figure 6A:
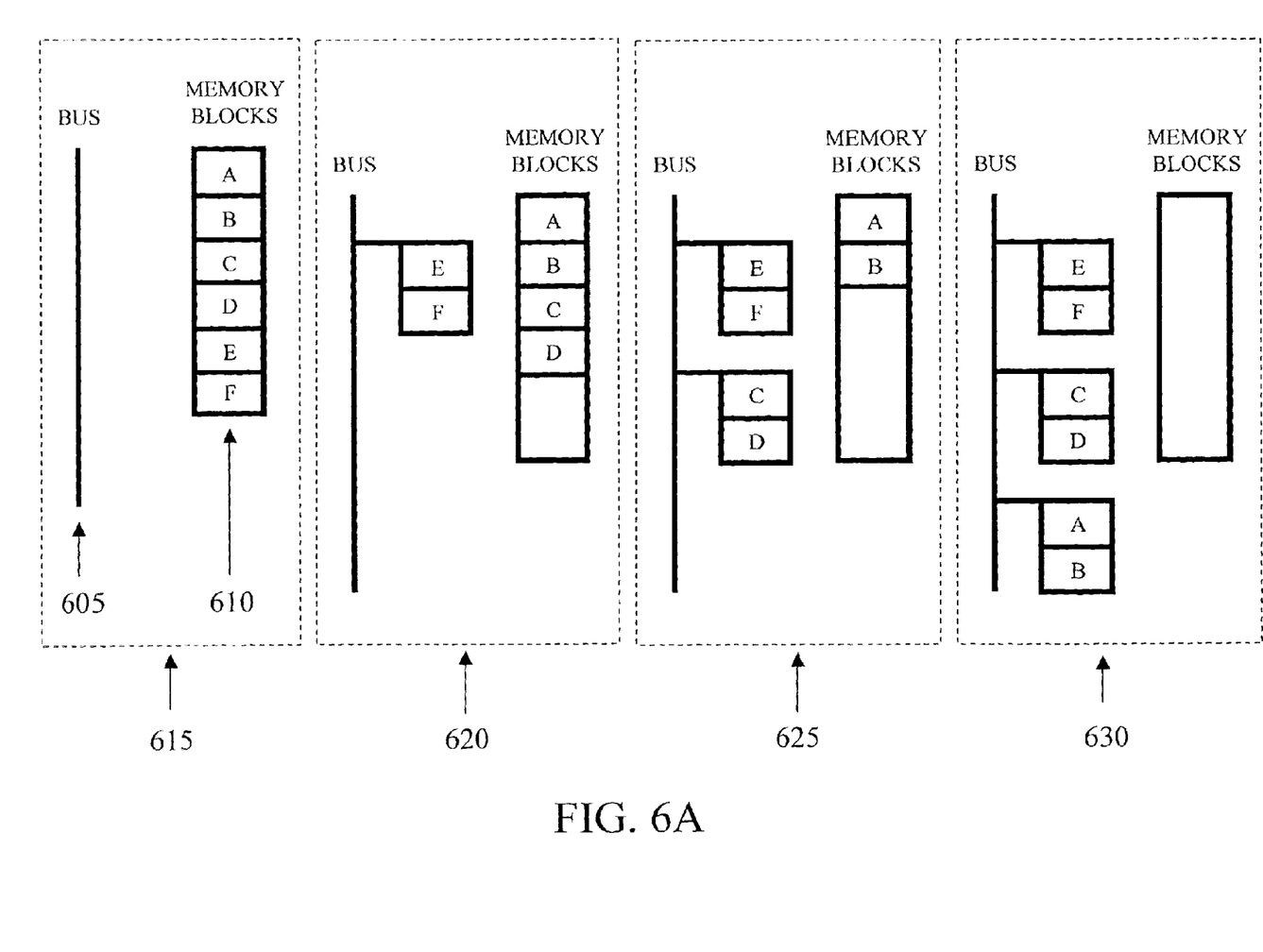
FIGS. 6A and 6B are block diagrams illustrating steps for managing an allocation of a portion of a memory associated with a central processing unit system that can be selectively coupled to a bus of a central processing unit system in accordance with an exemplary embodiment of the present invention.
Figure 6B:
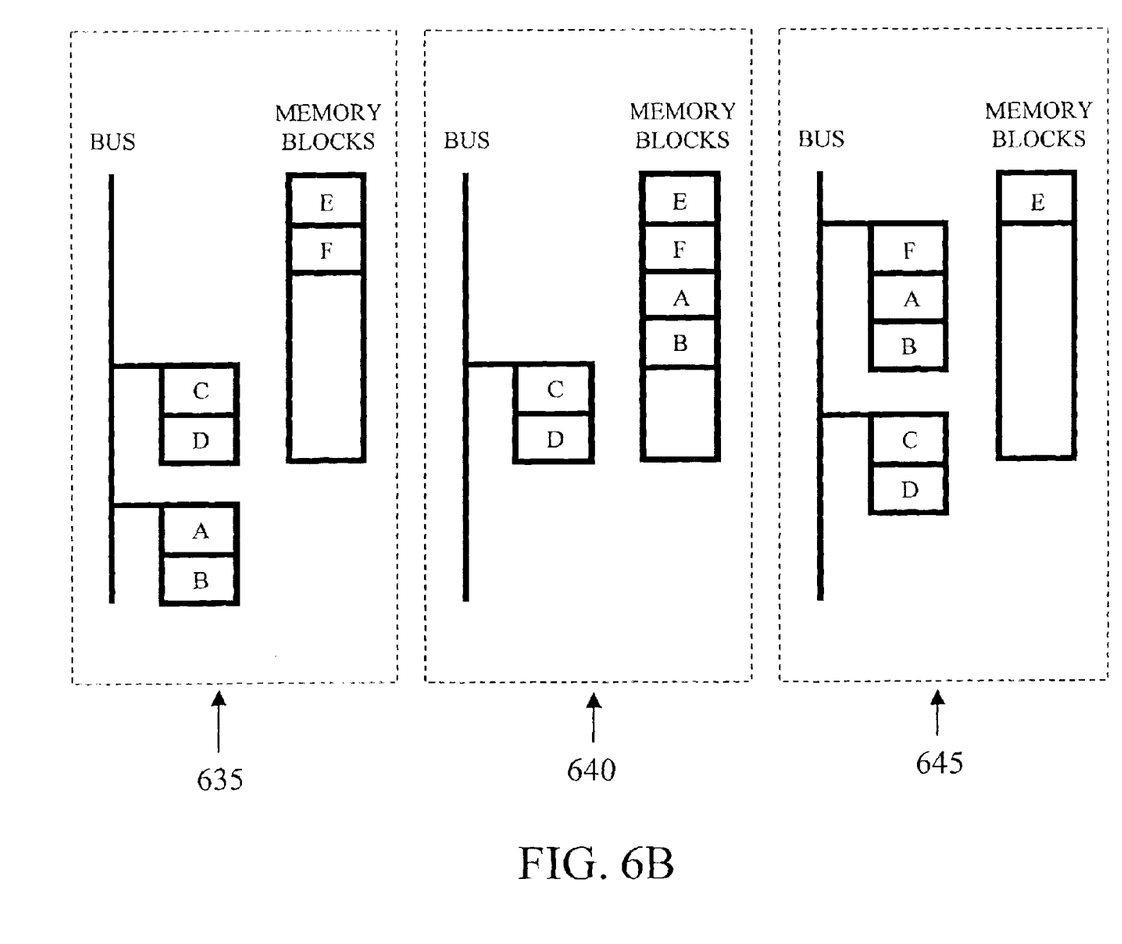

To further illustrate an exemplary embodiment of the present invention, FIGS. 6A and 6B are block diagrams illustrating the steps carried out for managing an allocation of a portion of a memory associated with a central processing unit system that can be selectively coupled to a bus of the central processing unit system. As shown in block 615 of FIG. 6A, according to exemplary embodiments, all memory blocks of memory pool 610 are electrically detached and disconnected from bus 605. For purposes of illustration, assume there are six memory blocks in the memory. In block 620, a first process requests two memory blocks. In response, blocks E and F are allocated and electrically attached to bus 605. In block 625, a second process requests two memory blocks. In response, blocks C and D are allocated and electrically attached to bus 605. In block 630, a third process requests two memory blocks. In response, blocks A and B are allocated and electrically attached to bus 605.

In block 635 of FIG. 6B, the first process terminates and memory blocks E and F are electrically decoupled from the bus, deallocated and returned to memory pool 610. Since memory blocks are appended to the memory at the last free address of the memory, blocks E and F are not necessarily returned to the same address from which they were originally allocated. In block 640, the third process terminates and memory blocks A and B are electrically decoupled from the bus, deallocated and returned to memory pool 610. In block 645, a fourth process requests three memory blocks. In response, blocks F, A and B are allocated and electrically attached to bus 605. Thus, according to exemplary embodiments, the processes have not been moved in memory to provide three contiguous memory blocks to accommodate the fourth process' memory requirements, as would be done in conventional memory management schemes, such as shown in steps 125 and 130 of FIG. 1.

Rather, the addresses of the memory have been changed before they are electrically coupled to the bus so that the fourth process can be allocated the three contiguous blocks of memory without having to move the fourth process in memory.

The single processor, single bus architecture discussed above is presented for purposes of illustration only. Those of ordinary skill in the art will recognize that exemplary embodiments of the present invention can be used with any number of processors and buses in the CPU system.

Figure 7:
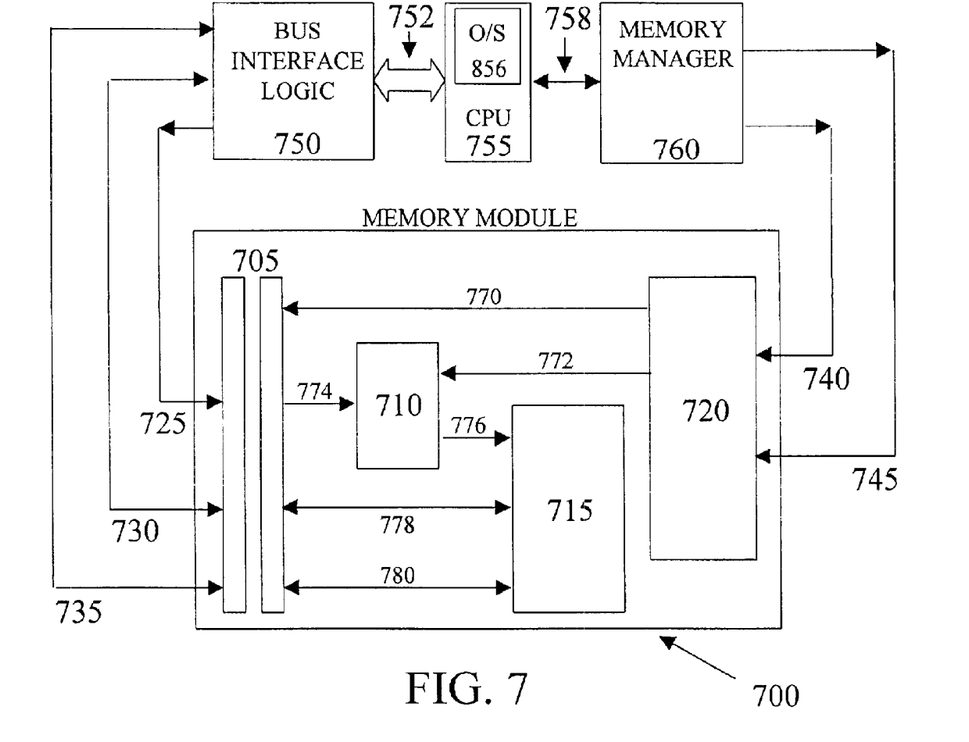
FIG. 7 is a block diagram illustrating a system for managing an allocation of a portion of a memory in accordance with an exemplary embodiment of the present invention.

A system for managing an allocation of a portion of a memory in accordance with an exemplary embodiment of the present invention is illustrated in FIG. 7. According to exemplary embodiments, the system comprises at least one central processing unit, at least one bus connected to the at least central processing unit, and at least one memory module associated with the memory. According to exemplary embodiments, central processing unit (CPU) 755 can be any processor, such as, for example, a microprocessor or any other type of processor.

Figure 8:
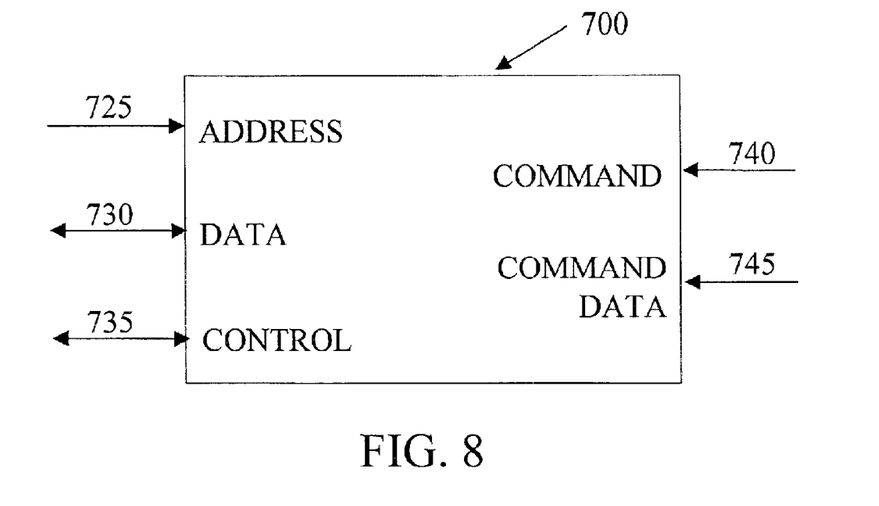
FIG. 8 is a block diagram illustrating external connections to a memory module in accordance with an exemplary embodiment of the present invention.

The at least one bus can be any collection of wires or any other form of electrical connection through which data or any other form of electrical signal is transmitted from one part of a computer to another. FIG. 8 illustrates the external connections to a memory module 700. According to exemplary embodiments, the at least one bus is a system bus internal to the CPU system that connects all the internal computer components to the CPU and memory. As a system bus, the at least one bus can be divided into several buses, such as, for example, an address bus 725, a data bus 730, and a control bus 735. For example, address bus 725 can transfer address information on where data should go. Data bus 730 can transfer the actual data to and from memory. Control bus 735 can transfer control signals, such as a bus command (e.g., read or write) from CPU 755 or return an acknowledge signal from memory module 700 to indicate that a read or write operation has been completed.

The at least one bus can be connected to CPU 755 using, for example, bus interface logic 750. Bus interface logic 750 can be any form of bus interface logic for connecting memory over the at least one bus to CPU 755, such as, for example, data/address transceivers for performing data/address buffering, or any other form of bus interface logic. Bus interface logic 750 can, for example, regulate the direction of data and address flow during memory references. Data is sent to memory module 700 during a memory write, while data flow is in the opposite direction for a memory read. Bus interface logic 750 also receives and routes addresses to memory module 700 using address bus 725. Bus interface logic 750 can be connected to CPU 755 using bus interface logic connection 752. Bus interface logic connection 752 can be any form of electrical connection that is capable of carrying electrical signals between electronic components.

According to exemplary embodiments, the at least one memory module is electrically decoupled from the at least one bus. Thus, memory module 700 is independent of and isolated from the at least one bus (address bus 725, data bus 730 and control bus 735) so that there is no fixed connection between the at least one memory module and the at least one bus.

The at least one memory module is comprised of means for electrically coupling the at least one memory module with the at least one bus. According to exemplary embodiments, each memory module 700 can be electrically attached to and detached from the at least one bus. Bus coupler 705 of memory module 700 can be used as the means for electrically attaching and detaching memory module 700 from the at least one bus. For example, bus coupler 705 can be a tri-state, bi-directional buffer interface between the at least one bus (address bus 725, data bus 730 and control bus 735) and memory module 700. However, bus coupler 705 can be any form of bus interface logic that can electrically attach and detach memory module 700 to and from the at least one bus.

The at least one memory module is comprised of at least one memory unit. Memory unit 715 of memory module 700 can be, for example, random access memory (RAM) or any other form of addressable read/write memory that can be allocated to applications or processes running in the CPU system that require internal storage in the CPU system.

The at least one memory module includes an address decoder for reconfiguring a portion of an address of the at least one memory module, such as reconfigurable address decoder 710. According to exemplary embodiments, each memory module 700 can have its memory address space reassigned. Thus, the address of memory module 700 can be changed. For example, the upper or high-order address bits of each memory module 700 can be electrically reconfigured or changed so that each memory module 700 can have any address within the system memory space of the CPU system. The lower or low-order address bits can select the storage location within memory unit 715 of each memory module 700. Thus, reconfigurable address decoder 710 can be any type of reconfigurable address decoder that can electrically reconfigure the high-order address bits of memory module 700 and use the low-order address bits to access local memory resident in memory unit 715. Reconfigurable address decoder 710 is connected to memory unit 715 using memory unit connection 776. Memory unit connection 776 can be any form of electrical connection that is capable of carrying electrical signals between electronic components.

The at least one memory module includes a command interface for receiving commands for allocating the at least one memory module. For example, command interface 720 of memory module 700 can be the interface between memory module 700 and a memory manager 760.

The system for managing an allocation of a portion of a memory includes a memory manager coupled with the at least one memory module and the at least one central processing unit. Memory manager 760 can be any form of memory management unit, such as, for example, a paged memory management unit. Memory manager 760 can be connected to CPU 755 using memory manager connection 758. Memory manager connection 758 can be any form of electrical connection that is capable of carrying electrical signals between electronic components. According to exemplary embodiments, the at least one memory module (e.g., memory module 700) is coupled with the memory manager (e.g., memory manager 760) using the command interface (e.g., command interface 720).

Memory manager 760 can send commands to memory module 700 using command connection 740, which is connected to command interface 720 of memory module 700. Command connection 740 can be any form of electrical connection that is capable of carrying electrical signals between electronic components. For example, memory manager 760 can send a command to memory module 700 to electrically attach to and detach from the at least one bus. When such a command is received at command interface 720, the command can be routed to bus coupler 705 over bus coupler command connection 770 in memory module 700. When the command is received by bus coupler 705, bus coupler 705 can connect reconfigurable address decoder 710 to address bus 725 through address bus connection 774 in memory module 700. Bus coupler 705 can connect memory unit 715 to data bus 735 using data bus connection 778 in memory module 700. Bus coupler 705 can connect memory unit 715 to control bus 735 using control bus connection 780 in memory module 700. Address bus connection 774, data bus connection 778, and control bus connection 780 can each be any form of electrical connection that is capable of carrying electrical signals between electronic components. Those of ordinary skill in the art will recognize that the command from memory manager 760 to bus coupler 705 to electrically attach to or detach from the at least one bus can instruct bus coupler 705 to attach to or detach from any combination or all of address bus 725, data bus 730, or control bus 735.

Memory manager 760 is configured to allocate the at least one memory module for a range of addresses in a system memory space of the at least one central processing unit. For example, memory manager 760 can send a command to memory module 700 to reconfigure the high-order address bits of memory module 700 to a particular address or range of addresses. Once reconfigured, the high-order address bits of reconfigurable address decoder 710 specify the address at which memory module 700 will be accessed in the system memory space of the at least one CPU. When such a command is received at command interface 720, the command can be routed to reconfigurable address decoder 710 using address reconfigure command connection 772. For commands sent to memory module 700 from memory manager 760, command data that accompanies the commands can be sent to memory module 700 using command data connection 745, which is connected to command interface 720 of memory module 700. Command data connection 745 can be any form of electrical connection that is capable of carrying electrical signals between electronic components.

According to exemplary embodiments, the range of addresses in the system memory space of the at least one CPU is assigned for use by the at least one memory module while the memory module is decoupled from the at least one bus. The system memory space of the CPU is the total range of addresses available for applications and processes. According to exemplary embodiments, the system memory space is large enough to hold the address spaces of at least one process concurrently. Thus, an operating system (O/S) 756 running on CPU 755 can assign the first range of addresses within the system memory space for use by at least one memory module, such as, for example, memory module 700. O/S 756 running on CPU 755 can then inform memory manager 760 over memory manager connection 758 of the first range of addresses. Memory manager 760 can then send a command to memory module 700 over command connection 740 to electrically reconfigure the high-order address bits of reconfigurable address decoder 710 to the first range of addresses assigned by the operating system. The actual range of addresses can be sent to memory module 700 over command data connection 745. Once electrically reconfigured, memory module 700 will be accessible at the specified range of addresses once it is electrically coupled to the at least one bus.

According to exemplary embodiments, an allocated at least one memory module is accessed using a pointer to the allocated at least one memory module when the allocated at least one memory module is coupled to the bus. Thus, once memory module 700 is electrically reconfigured to the specified range of addresses, it can be electrically coupled to the at least one bus in response to a command from memory manager 760. Once allocated and electrically coupled, applications or processes can access the memory of memory module 700 using, for example, a pointer to the memory space of allocated and electrically coupled memory module 700. The application or process can write to and read from the allocated and electrically coupled memory module 700 in the range of specified addresses using, for example, address bus 725, data bus 730 and control bus 735.

Once the application or process terminates or is otherwise finished using the memory space of the allocated and electrically coupled memory module 700, memory module 700 is deallocated and electrically decoupled from the at least one bus. For example, the application or process can return the pointer to the memory space of allocated and electrically coupled memory module 700 to indicate that the application or process is finished with the allocated and electrically coupled memory. However, any form of indication from the application or process that signifies that the application or process is finished with the allocated and electrically coupled memory can be used. Upon receiving such an indication, O/S 756 can instruct memory manager 760 to deallocate and electrically decouple memory module 700. For example, memory manager 760 can send a command to bus coupler 705 to electrically decouple any number or all of the at least one bus from memory module 700. Memory manager 760 can also send a command to reconfigurable address decoder 710 to reset the address of memory module 700. For example, memory manager 700 can send a command to the at least one memory module (e.g., memory module 700) to assign a last address of the memory when the at least one memory module is decoupled from the at least one bus.

According to exemplary embodiments, the pool of available memory can be organized in a LIFO structure or any other type of memory structure in which the most-recently decoupled and deallocated memory modules returned to the pool of memory are the first memory modules allocated and coupled the next time an application or process requests memory. Thus, the last address in the memory is the last free address in the pool of available memory. The at least one memory module can be appended to the memory at the last address when the at least one memory module is decoupled from the at least one bus. The at least one memory module is then available for allocation and electrical coupling when another application or process requests an allocation of memory.

Those of ordinary skill in the art will recognize that bus decoupler 705, reconfigurable address decoder 710, memory unit 715, and command interface 720 of memory module 700 can be co-located, for example, they can reside on the same integrated circuit (IC) chip within a CPU system. However, each of these components or any combination thereof can be located in different areas throughout the CPU system, such as, for example, on different IC chips that are connected using the various component connections (770, 772, 774, 776, 778, and 780).

The single processor architecture shown in FIG. 7 is presented for purposes of illustration only. Those of ordinary skill in the art will recognize that exemplary embodiments of the present invention can be used with any number and types of processors and buses in a CPU system.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for managing an allocation of a portion of a memory associated with a central processing unit system that can be selectively coupled to a bus of the central processing unit system, comprising the steps of:

allocating a first portion of the memory for a first range of addresses;

selectively coupling the allocated first portion of the memory to the bus of the central processing unit system;

decoupling the selectively coupled first portion of the memory from the bus of the central processing unit system;

appending the decoupled first portion to the memory with an address range which is reallocated maintain deallocated memory contiguous within the memory; and reallocating the decoupled first portion of the memory for a second range of addresses.

2. The method of claim 1, comprising the steps of:

allocating a second portion of the memory for a third range of addresses;

selectively coupling the allocated second portion of the memory to the bus of the central processing unit system; and decoupling the selectively coupled second portion of the memory from the bus of the central processing unit system.

3. The method of claim 1, wherein the step of allocating comprises the step of:

requesting the allocation of the first portion of the memory.

4. The method of claim 1, wherein the step of allocating comprises the step of:

determining the first range of addresses by locating available memory space in a system memory space associated with the central processing unit system.

5. The method of claim 4, wherein the step of allocating comprises the step of:

reserving the first range of addresses within the system memory space for the first portion of the memory.

6. The method of claim 5, wherein the step of allocating comprises the step of:

requesting the first portion of the memory for the system memory space at the first range of addresses.

7. The method of claim 1, wherein the step of allocating comprises the step of:

determining the availability of the first portion of the memory.

8. The method of claim 6, wherein the step of allocating comprises the step of:

assigning the first range of addresses in the system memory space to the first portion of the memory.

9. The method of claim 1, wherein the step of coupling comprises the step of:

returning a pointer to the first portion of the memory.

10. The method of claim 1, wherein the step of decoupling comprises the step of:

assigning a last address of the memory to the decoupled first portion of the memory.

11. The method of claim 10, wherein the step of decoupling comprises the step of:

appending the decoupled first portion of the memory to the memory at the last address.

12. A system for managing an allocation of a portion of a memory, comprising:

at least one central processing unit;

at least one bus connected to the at least one central processing unit; and at least one memory module associated with a memory, wherein the at least one memory module is electrically decoupled from the at least one bus and appended to the memory with an address range which is reallocated to maintain deallocated memory contiguous within the memory, and wherein the at least one memory module comprises:

means for electrically coupling the at least one memory module with the at least one bus, and at least one memory unit.

13. The system of claim 12, wherein the at least one memory block comprises:

an address decoder for reconfiguring a portion of an address of the at least one memory module, and a command interface for receiving commands for allocating the at least one memory module.

14. The system of claim 13, comprising:

a memory manager coupled with the at least one memory module and the at least one central processing unit, wherein the at least one memory module is coupled with the memory manager using the command interface, and wherein the memory manager is configured to allocate the at least one memory module for a range of addresses in a system memory space of the at least one central processing unit.

15. The system of claim 14, wherein the range of addresses in the system memory space of the at least one central processing unit is assigned for use by the at least one memory module while the memory module is decoupled from the at least one bus.

16. The system of claim 14, wherein an allocated at least one memory module is accessed using a pointer to the allocated at least one memory module when the allocated at least one memory module is coupled to the bus.

17. The system of claim 12, wherein the at least one memory module is assigned a last address of the memory when the at least one memory module is decoupled from the at least one bus.

18. The system of claim 17, wherein the at least one memory module is appended to the memory at the last address when the at least one memory module is decoupled from the at least one bus.

* * * * *